(12) United States Patent
Rowlands et al.

(10) Patent No.: US 6,571,321 B2
(45) Date of Patent: May 27, 2003

(54) READ EXCLUSIVE FOR FAST, SIMPLE INVALIDATE

(75) Inventors: Joseph B. Rowlands, Santa Clara, CA (US); Michael D. Carlson, Mountain View, CA (US)

(73) Assignee: Broadcom Corporation, Irvine, CA (US)

(*) Notice: Subject to any disclaimer, the term of this patent is extended or adjusted under 35 U.S.C. 154(b) by 131 days.

(21) Appl. No.: 09/917,432

(22) Filed: Jul. 27, 2001

(65) Prior Publication Data

US 2003/0023817 A1 Jan. 30, 2003

(51) Int. Cl.$^7$ .............................................. G06F 12/00
(52) U.S. Cl. ....................................... 711/141; 711/146
(58) Field of Search ................................ 711/141, 146, 711/147

(56) References Cited

PUBLICATIONS

SiByte, "Target Applications," http://sibyte.com/mercurian/applications.htm, Jan. 15, 2001, 2 pages.
SiByte, "SiByte Technology," http://sibyte.com/mercurian/technology.htm, Jan. 15, 2001, 3 pages.
SiByte, "The Mercurian Processor," http://sibyte.com/mercurian, Jan. 15, 2001, 2 pages.
SiByte, "Fact Sheet," SB–1 CPU, Oct. 2000, rev. 0.1, 1 page.
SiByte, "Fact Sheet," SB–1250, Oct. 2000, rev. 0.2, 10 pages.
Stepanian, SiByte, SiByte SB–1 MIPS64 CPU Core, Embedded Processor Forum 2000, Jun. 13, 2000, 15 pages.
Jim Keller, "The Mercurian Processor: A High Performance, Power–Efficient CMP for Networking," Oct. 10, 2000, 22 pages.
Tom R. Halfhill, "SiByte Reveals 64–Bit Core For NPUs; Independent MIPS64 Design Combines Low Power, High Performance," Microdesign Resources, Jun. 2000, Microprocessor Report, 4 pages.
"PowerPC 601," RISC Microprocessor User's Manual, Rev. 1, Motorola, Inc. 1993, pp. 9–28 to 9–29.
Patterson and Hennessy, "Computer Architecture A Quantitative Approach," Second Edition, Morgan Kaufmann Publishers, Inc., 1990/1996, pp. 635–760.

*Primary Examiner*—Kevin Verbrugge
(74) *Attorney, Agent, or Firm*—Lawrence J. Merkel; Meyertons, Hood, Kivlin, Kowert & Goetzel, P.C.

(57) ABSTRACT

An agent, in response to a write to a shared block, is configured to initiate a read exclusive transaction on an interface on which the agent communicates. Additionally, the agent is configured to indicate, to a responding agent or agents on the interface, that a data transfer is not required from the responding agent or agents in response to the read exclusive transaction. In one embodiment, the agent indicates to the responding agents that a data transfer is not required in a response phase of the transaction. Specifically, the agent may respond in such a way that the agent indicates that it will provide the data (i.e. that the agent will provide the data to itself). For example, the agent may respond with an exclusive ownership indication. On the interface for such an embodiment, an exclusive ownership response may require that the agent having exclusive access respond with the data.

24 Claims, 6 Drawing Sheets

READ EXCLUSIVE FOR FAST, SIMPLE INVALIDATE

BACKGROUND OF THE INVENTION

1. Field of the Invention

This invention is related to the field of caches and, more particularly, to the handling of stores to shared cache lines.

2. Description of the Related Art

A bus is frequently used in systems to interconnect a variety of devices included in the system. Generally, one or more devices are connected to the bus, and use the bus to communicate with other devices connected to the bus. Other systems may use other types of interconnect (e.g. distributed packet-based interfaces, etc.) for communicating between devices. As used herein, the term "agent" refers to a device which is capable of communicating on an interface. The agent may be a requesting agent if the agent is capable of initiating transactions on the interface and may be a responding agent if the agent is capable of responding to a transaction initiated by a requesting agent. A given agent may be capable of being both a requesting agent and a responding agent. Additionally, a "transaction" is a communication on the interface. The transaction may include an address transfer and optionally a data transfer. Transactions may be read transactions (transfers of data from the responding agent to the requesting agent) and write transactions (transfers of data from the requesting agent to the responding agent). Transactions may further include various coherency commands which may or may not involve a transfer of data.

Frequently, transactions are initiated by agents to access memory. Since agents may cache data accessed from memory (to decrease the latency of subsequent accesses to the data), a coherency scheme may be used to ensure that the various copies of data in caches and the copy in memory remain consistent in view of updates to the data. Generally, each block in the cache may have a coherency state associated with it. The coherency state is an indication of the state of the block with respect to the corresponding data in main memory, as well as an indication of whether or not other copies are stored in other caches within the system. A variety of coherency schemes exist, many of which may include a shared coherency state. For example, the popular MESI (Modified, Exclusive, Shared, Invalid) and MOESI (Modified, Owned, Exclusive, Shared, Invalid) schemes (and various simplified forms thereof) include a shared state. The shared state indicates that the corresponding block is valid and may by cached in at least one other cache.

When an agent attempts to write a block for which the coherency state is shared (a "shared cache block" or a "shared block" herein), the other cached blocks are typically invalidated to ensure that data which does not reflect the write is not subsequently used by any agent. There are several ways to accomplish the invalidation. On some interfaces, an explicit invalidate command is used. Receivers of the invalidate command invalidate the block indicated by the address included in the invalidate command. Unfortunately, this solution requires a command encoding on the interface to be dedicated to the invalidate command, utilizing an encoding which could be used for some other transaction type and requiring logic in the receiver of the invalidate command to decode the command and take appropriate action. Another solution is to invalidate the block in the agent attempting to write the block and then for the agent to read the block with a read exclusive command. The read exclusive command causes other copies of the block to be invalidated and the block is returned to the agent in a data phase of the read exclusive command. Unfortunately, this solution may increase the latency of the write, since the data must be returned on the interface before the write can be completed. Furthermore, the data phase may be delayed due to competition for interface bandwidth (e.g. with the data phases of earlier transactions) or due to competition for memory bandwidth to read the data block from memory.

SUMMARY OF THE INVENTION

An agent is described which, in response to a write to a shared block, is configured to initiate a read exclusive transaction on an interface on which the agent communicates. Additionally, the agent is configured to indicate, to a responding agent or agents on the interface, that a data transfer is not required from the responding agent or agents in response to the read exclusive transaction. In one embodiment, a separate encoding/logic for an invalidate transaction may be avoided, as may the complexities of handling invalidate transactions for writes to shared blocks (e.g. the underlying block being invalidated and thus having to change the invalidate transaction to another type of transaction). Additionally, latency related to the responding agent or agents (e.g. memory controllers, L2 caches, etc.) may not affect completion of the write to the shared block, in one embodiment.

In one embodiment, the agent indicates to the responding agents that a data transfer is not required in a response phase of the transaction. Specifically, the agent may respond in such a way that the agent indicates that it will provide the data (i.e. that the agent will provide the data to itself). For example, the agent may respond with an exclusive ownership indication. On the interface for such an embodiment, an exclusive ownership response may require that the agent having exclusive access respond with the data.

Broadly speaking, an agent is contemplated. The agent comprises a cache and an interface circuit. The cache is configured to store at least a first cache block and a first coherency state corresponding to the first cache block. The interface circuit is configured to communicate on an interface with other agents, wherein the interface circuit is configured to initiate a read exclusive transaction on the interface in response to a write which hits the first cache block and the first coherency state is shared. The interface circuit is configured, during the read exclusive transaction, to indicate to one or more responding agents of the read exclusive transaction that a data transfer is not required for the read exclusive transaction.

Additionally, a method is contemplated. A write hit to a first cache block is detected in a cache within first agent. A first coherency state corresponding to the first cache block is shared. A read exclusive transaction is initiated on an interface from the first agent in response to the detecting. During the read exclusive transaction, an indication is provided to one or more responding agents of the transaction that a data transfer is not required for the read exclusive transaction.

Moreover, an agent is contemplated. The agent comprises a cache configured to store at least a first cache block and a first coherency state corresponding to the first cache block, and an interface circuit. The interface circuit is configured to communicate on an interface with other agents, and is configured to initiate a read exclusive transaction on the interface in response to a write which hits the first cache block and the first coherency state is shared. The interface circuit is configured, during a response phase of the read exclusive transaction, to provide a first response indicating that the agent will provide data for the read exclusive transaction.

BRIEF DESCRIPTION OF THE DRAWINGS

The following detailed description makes reference to the accompanying drawings, which are now briefly described.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

System Overview

Figure 1:
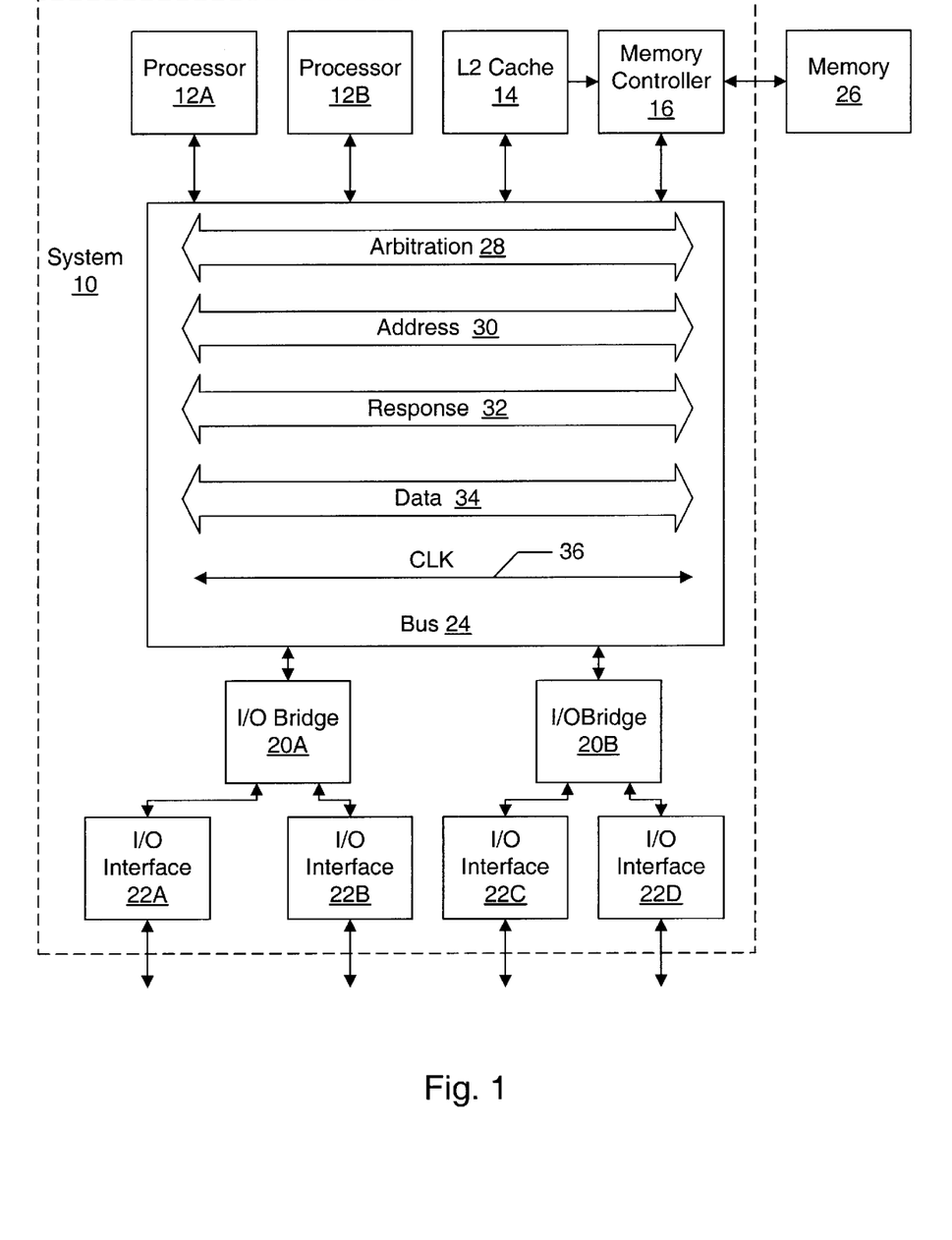
FIG. 1 is a block diagram of one embodiment of a system.

Turning now to FIG. 1, a block diagram of one embodiment of a system 10 is shown. Other embodiments are possible and contemplated. In the embodiment of FIG. 1, system 10 includes processors 12A–12B, an L2 cache 14, a memory controller 16, a pair of input/output (I/O) bridges 20A–20B, and I/O interfaces 22A–22D. System 10 may include a bus 24 for interconnecting the various components of system 10. More particularly, as illustrated in FIG. 1, bus 24 may include arbitration lines 28, an address bus 30, response lines 32, a data bus 34, and a clock line or lines 36. As illustrated in FIG. 1, each of processors 12A–12B, L2 cache 14, memory controller 16, and I/O bridges 20A–20B are coupled to bus 24. Thus, each of processors 12A–12B, L2 cache 14, memory controller 16, and I/O bridges 20A–20B may be an agent on bus 24 for the illustrated embodiment. More particularly, each agent may be coupled to clock line(s) 36 and to the conductors within bus 24 that carry signals which that agent may sample and/or drive. I/O bridge 20A is coupled to I/O interfaces 22A–22B, and I/O bridge 20B is coupled to I/O interfaces 22C–22D. L2 cache 14 is coupled to memory controller 16, which is further coupled to a memory 26.

Bus 24 may be a split transaction bus in the illustrated embodiment. A split transaction bus splits the address and data portions of each transaction and allows the address portion (referred to as the address phase) and the data portion (referred to as the data phase) to proceed independently. In the illustrated embodiment, the address bus 30 and data bus 34 are independently arbitrated for (using signals on arbitration lines 28). Each transaction including both address and data thus includes an arbitration for the address bus 30, an address phase on the address bus 30, an arbitration for the data bus 34, and a data phase on the data bus 34. Additionally, coherent transactions may include a response phase on response lines 32 for communicating coherency information after the address phase. The bus clock signal CLK on clock line(s) 36 defines the clock cycle for bus 24, or may be a multiple or ratio thereof.

Bus 24 may be pipelined. Bus 24 may employ any suitable signalling technique. For example, in one embodiment, differential signalling may be used for high speed signal transmission. Other embodiments may employ any other signalling technique (e.g. TTL, CMOS, GTL, HSTL, etc.).

Processors 12A–12B may be designed to any instruction set architecture, and may execute programs written to that instruction set architecture. Exemplary instruction set architectures may include the MIPS instruction set architecture (including the MIPS-3D and MIPS MDMX application specific extensions), the IA-32 or IA-64 instruction set architectures developed by Intel Corp., the PowerPC instruction set architecture, the Alpha instruction set architecture, the ARM instruction set architecture, or any other instruction set architecture.

L2 cache 14 is a high speed cache memory. L2 cache 14 is referred to as "L2" since processors 12A–12B may employ internal level 1 ("L1") caches. If L1 caches are not included in processors 12A–12B, L2 cache 14 may be an L1 cache. Furthermore, if multiple levels of caching are included in processors 12A–12B, L2 cache 14 may be an outer level cache than L2. L2 cache 14 may employ any organization, including direct mapped, set associative, and fully associative organizations. In one particular implementation, L2 cache 14 may be a 512 kilobyte, 4 way set associative cache having 32 byte cache lines. A set associative cache is a cache arranged into multiple sets, each set comprising two or more entries. A portion of the address (the "index") is used to select one of the sets (i.e. each encoding of the index selects a different set). The entries in the selected set are eligible to store the cache line accessed by the address. Each of the entries within the set is referred to as a "way" of the set. The portion of the address remaining after removing the index (and the offset within the cache line) is referred to as the "tag", and is stored in each entry to identify the cache line in that entry. The stored tags are compared to the corresponding tag portion of the address of a memory transaction to determine if the memory transaction hits or misses in the cache, and is used to select the way in which the hit is detected (if a hit is detected).

Memory controller 16 is configured to access memory 26 in response to memory transactions received on bus 24. Memory controller 16 receives a hit signal from L2 cache 14, and if a hit is detected in L2 cache 14 for a memory transaction, memory controller 16 does not respond to that memory transaction. If a miss is detected by L2 cache 14, or the memory transaction is non-cacheable, memory controller 16 may access memory 26 to perform the read or write operation. Memory controller 16 may be designed to access any of a variety of types of memory. For example, memory controller 16 may be designed for synchronous dynamic random access memory (SDRAM), and more particularly double data rate (DDR) SDRAM. Alternatively, memory controller 16 may be designed for DRAM, Rambus DRAM (RDRAM), SRAM, or any other suitable memory device.

I/O bridges 20A–20B link one or more I/O interfaces (e.g. I/O interfaces 22A–22B for I/O bridge 20A and I/O interfaces 22C–22D for I/O bridge 20B) to bus 24. I/O bridges 20A–20B may serve to reduce the electrical loading on bus 24 if more than one I/O interface 22A–22B is bridged by that I/O bridge. Generally, I/O bridge 20A performs transactions on bus 24 on behalf of I/O interfaces 22A–22B and relays transactions targeted at an I/O interface 22A–22B from bus 24 to that I/O interface 22A–22B. Similarly, I/O bridge 20B generally performs transactions on bus 24 on behalf of I/O interfaces 22C–22D and relays transactions targeted at an I/O interface 22C–22D from bus 24 to that I/O interface 22C–22D. In one implementation, I/O bridge 20A may be a bridge to a PCI interface (e.g. I/O interface 22A) and to a Lightning Data Transport (LDT) I/O fabric (also known as HyperTransport) developed by Advanced Micro Devices, Inc. (e.g. I/O interface 22B). Other I/O interfaces may be bridged by I/O bridge 20B. Other implementations may bridge any combination of I/O interfaces using any combination of I/O bridges. I/O interfaces 22A–22D may include one or more serial interfaces, Personal Computer Memory Card International Association (PCMCIA) interfaces, Ethernet interfaces (e.g. media access control level interfaces), Peripheral Component Interconnect (PCI) interfaces, LDT interfaces, etc.

It is noted that system 10 (and more particularly processors 12A–12B, L2 cache 14, memory controller 16, I/O interfaces 22A–22D, I/O bridges 20A–20B and bus 24) may be integrated onto a single integrated circuit as a system on a chip configuration. In another configuration, memory 26 may be integrated as well. Alternatively, one or more of the components may be implemented as separate integrated circuits, or all components may be separate integrated circuits, as desired. Any level of integration may be used.

It is noted that, while the illustrated embodiment employs a split transaction bus with separate arbitration for the address and data buses, other embodiments may employ non-split transaction buses arbitrated with a single arbitration for address and data and/or a split transaction bus in which the data bus is not explicitly arbitrated. Either a central arbitration scheme or a distributed arbitration scheme may be used, according to design choice.

It is noted that, while FIG. 1 illustrates I/O interfaces 22A–22D coupled through I/O bridges 20A–20B to bus 24, other embodiments may include one or more I/O interfaces directly coupled to bus 24, if desired. Furthermore, embodiments in which one processor 12A or more than two processors are included are contemplated.

Write Hit Shared Handling

Figure 2:
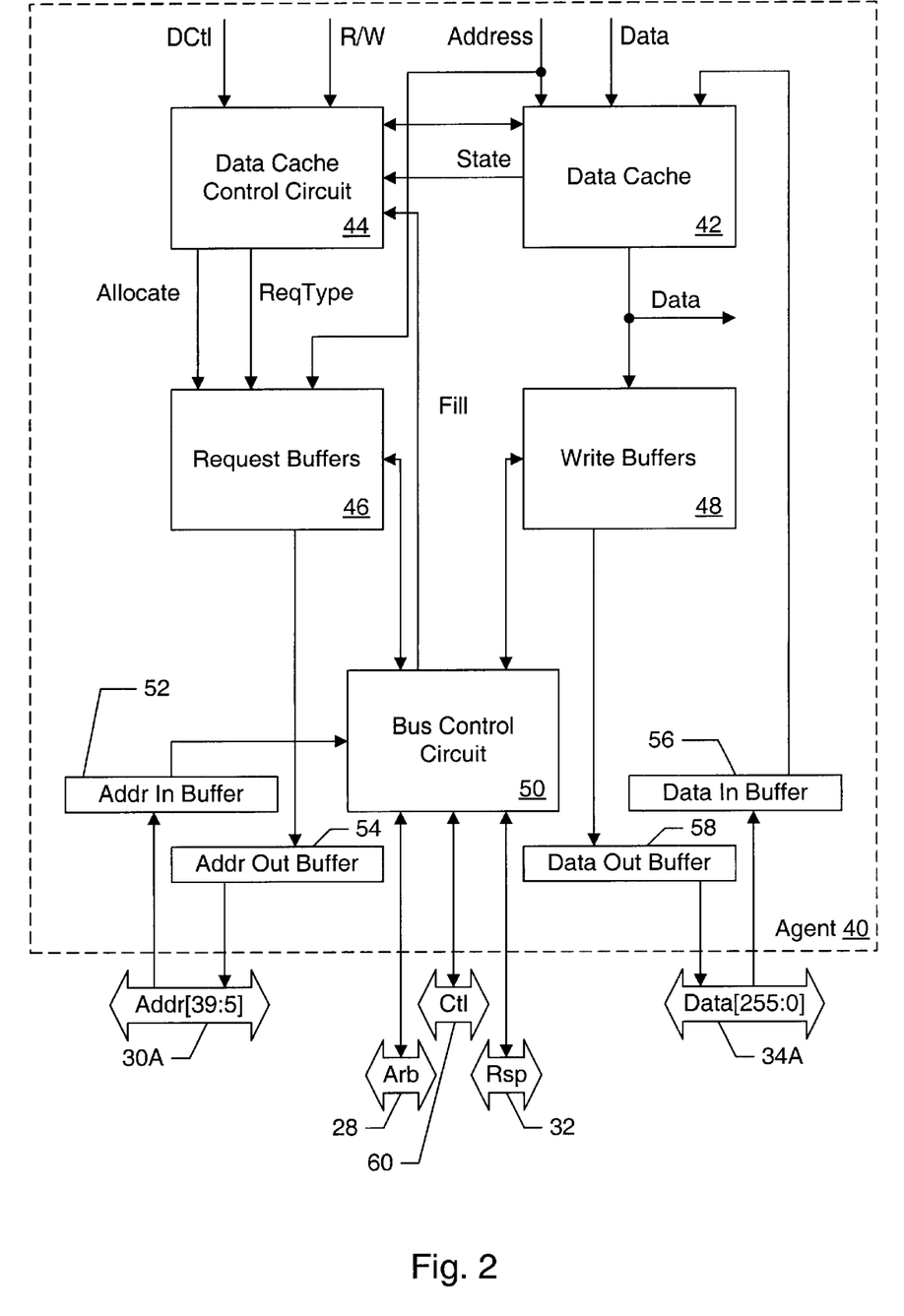
FIG. 2 is a block diagram of one embodiment of an agent.

Turning next to FIG. 2, a block diagram of a portion of one embodiment of an agent 40 is shown. Other embodiments are possible and contemplated. In the embodiment of FIG. 2, the agent 40 includes a data cache 42, a data cache control circuit 44, a set of request buffers 46, a set of write buffers 48, a bus control circuit 50, an address in buffer 52, an address out buffer 54, a data in buffer 56, and a data out buffer 58. The data cache control circuit 44 is coupled to receive a read/write (R/W) signal and other control signals (DCtl), and is coupled to the request buffers 46, the data cache 42, and the bus control circuit 50. The data cache 42 is further coupled to receive an address and is coupled to the data in buffer 56 and the write buffers 48. The write buffers 48 and the request buffers 46 are both coupled to the bus control circuit 50. The request buffers 46 are coupled to the address out buffer 54. The write buffers are coupled to the data out buffer 58. The address in buffer 52 and the address out buffer 54 are coupled to the address lines 30A (Addr [39:5]), which are part of the address bus 30. The data in buffer 56 and the data out buffer 58 are both coupled to the data lines 34A (Data[255:0]), which are part of the data bus 34. The bus control circuit 50 is coupled to control lines (which may include both control lines for the address bus 30 and control lines for the data bus 34) (Ctl—reference numeral 60) and is further coupled to the arbitration lines 28 and the response lines 32.

Generally, the agent 40 is configured to perform a read exclusive transaction on the bus 24 in response to attempting a write to a shared cache block in the data cache 42. Additionally, the agent 40 is configured to indicate, to one or more responding agents for the read exclusive transaction, that a data transfer for the read exclusive transaction is not required. For example, in one embodiment, during the response phase of the transaction, the agent 40 is configured to provide a response indicating that agent 40 will supply the data for the transaction. In other words, the agent 40 indicates that it will supply the data to itself. The agent 40 may or may not actually perform a data transfer on the bus 24, depending on design choice. Another embodiment may make the performance or nonperformance of the data transfer programmable via a configuration register, a tie-up or tie-down pin, etc. In another embodiment, the agent 40 may signal the responding agent directly (e.g. the memory controller 16 and/or L2 cache 14) during the transaction that a data transfer is not required. Such a signalling may occur at any time during the transaction (e.g. during the address phase, during the response phase) or throughout the transaction, as desired.

Since a read exclusive transaction (which may also be used for a write miss in data cache 42 or for other types of cache accesses where exclusive access to the cache block may be desirable) is used instead of an explicit invalidate-only transaction, a command encoding during the address phase for the invalidate transaction may be avoided. Agents which snoop the read exclusive transaction invalidate any cached copies of the affected cache block, similar to the response to an invalidate transaction. Additionally, complexities related to using an invalidate transaction for the write hit to a shared cache block may be avoided. For example, if another transaction invalidates the shared cache block before the invalidate transaction can be performed, the transaction must be changed to a read exclusive transaction.

Furthermore, by providing the data transfer of the read exclusive transaction from the initiating agent, latency caused by competing with other agents for memory bandwidth in the memory controller 16 (and memory 26) and/or in the L2 cache 14 may be alleviated. In embodiments in which data transfers can be performed out of order with respect to address transfers, the agent 40 may attempt to start the data phase of the read exclusive transaction rapidly, thus reducing the overall latency of the transaction. Furthermore, embodiments which do not actually perform the data transfer may further eliminate the latency of competing for the data bus 34 (and may update the shared cache block with the write data at the completion of the response phase). Viewed in another way, the bandwidth on the data bus 34 may be reduced by the lack of a data phase for the read exclusive transaction performed in response to a write hit to a shared cache block. However, debugging of the system 10 may be easier if the data transfer is performed (thus allowing address phases and data phases to be matched up). Furthermore, performing the data transfer (having a data phase) may reduce the likelihood of unusual bugs occurring due to an agent expecting a data transfer for a read exclusive transaction.

The operation of the embodiment of the agent 40 illustrated in FIG. 2 will now be described in more detail. Generally, agent circuitry (not shown) may generate addresses of memory locations to be accessed (read or written). For example, a processor agent such as processors 12A–12B shown in FIG. 1 may include circuitry to execute load and store instructions. Load instructions cause reads of memory, and store instructions cause writes to memory. The writes may be carried out via a read transaction (e.g. a read exclusive transaction) and a write to the cache block in cache. Other agents may generate reads and writes due to the operation of their circuitry as well. For example, an agent performing graphics operations may read or write graphics data in memory. The I/O bridges 20A–20B may include caches and the read/write operations may be generated by I/O interfaces/devices coupled thereto.

The address of the memory location is provided by the agent circuitry as an input to the data cache 42 (and the request buffers 46). Additionally, the read/write nature of the access is provided on a R/W line and other control information (e.g. the size of the access, etc.) may be provided on the DCtl lines by the agent circuitry to the data cache control circuit 44. The data cache 42 accesses the cache storage locations indicated by the address (e.g. one storage location indexed by a portion of the address in a direct mapped configuration, N storage locations indexed by the portion of the address for an N way set associative configuration, or all storage locations for a fully associative configuration) and determines whether or not the address hits in the data cache 42. The data cache 42 provides the coherency state of the cache block to the data cache control circuit 44.

Depending on the type of access and the coherency state, the data cache control circuit 44 may generate a request for a transaction on the bus 24 (allocating a request buffer in the request buffers 46 to store the request until selected by the bus control circuit 50 for transfer on the bus 24) and/or cause the data cache 42 to supply data for the access or capture the data into the affected cache block. For example, for read accesses which hit in the data cache 42, the data cache control circuit 44 may signal the data cache 42 to forward the data to the agent circuitry. For a read miss or a write miss, a cache block may be evicted (and may be stored in the write buffers 48 for writing back to the memory 26 if the cache block has been modified in the data cache 42) and a request for a read or read exclusive transaction may be queued in the request buffers 46. For a write hit shared, a request for the read exclusive transaction may be queued and, in one embodiment, the shared block may be evicted from the data cache 42 into the write buffers 48. For a write hit exclusive or modified, the data provided by the agent circuitry may be captured into the affected cache block.

The data output of the data cache 42 is shown coupled to the write buffers 48 and is also shown forwarding out to the agent circuitry. The data output may be the entire cache block, in which case there may be byte selection circuitry between the agent circuitry and the data cache 42 to select the byte or bytes requested by the access. Alternatively, the data output may be less than a cache block (e.g. an aligned set of four bytes, eight bytes, etc.), in which case multiple reads may be performed when a cache block is evicted from the data cache 42 into the write buffers 48.

If a transaction is to be requested in response to a cache access, the data cache control circuit 44 may allocate one of the request buffers 46 for the request using the allocate control signal or signals illustrated in FIG. 1. Additionally, the data cache control circuit 44 may provide a request type (ReqType) indicating the type of transaction to be performed. The ReqType may include an indication, for the read exclusive transaction, of whether or not a write hit to a shared cache block caused the request for the read exclusive transaction. The indication may be used by the bus control circuit 50 to determine whether or not a response indicating that the agent 40 will supply the data is to be provided in the response phase of the read exclusive transaction. It is noted that, in such an embodiment, circuitry may be included to snoop the request buffers 46. If an invalidate transaction occurs which invalidates the shared cache block corresponding to a read exclusive transaction, the indication in the ReqType may be changed by such circuitry.

If a cache block is to be evicted in response to a cache access and written back to memory (or supplied as data in the read exclusive transaction corresponding to a write hit to a shared block), the cache block is stored into one of the write buffers 48. The address of the evicted cache block may be queued in the request buffers 46, or may be stored in the write buffers 48 along with the evicted cache block.

The bus control circuit 50 scans the requests queued in the request buffers 46 and arbitrates for the address bus 30 using arbitration lines 28 if a request is ready for transmission on the bus 24. The bus control circuit 50 may select the address of the transaction into the address out buffer 54 and, in response to winning the arbitration, may cause the address to be driven of the address lines 30A during the address phase of the transaction. Additionally, the bus control circuit 50 may drive the address control signals on control lines 60 (including, e.g. the type of transaction which may include read, read exclusive, write, etc.). During the response phase of the transaction, the bus control circuit 50 may sample the response lines 32 to determine the coherency response from the other agents. Additionally, for read exclusive transactions resulting from a write hit to a shared cache block, the bus control circuit 50 may drive a response indicating that the agent 40 will supply the cache block.

The data phase of the transaction may be handled in various ways based on the transaction being performed. For reads (including read exclusives for misses), the bus control circuit 50 may monitor the control signals on the control lines 60 for an indication that the data phase is occurring. In one embodiment, for example, tagging may be used to link address phases and corresponding data phases. The bus control circuit 50 may assign a tag and drive the tag during the address phase, and then detect the tag during the data phase to receive the data transfer. Other embodiments may use other mechanisms (e.g. in order data transfers, etc.). For writes (and read exclusives for write hits to a shared block, for embodiments in which the data phase is actually performed), the bus control circuit 50 may arbitrate for the data bus 34 (using the arbitration lines 28). Additionally, the bus control circuit 50 may read the data from the corresponding write buffer 48 into the data out buffer 58. In response to winning the arbitration, the data may be driven on the data lines 34A and the bus control circuit 50 may further drive control signals on the control lines 60 which correspond to the data bus 34 to indicate that the data is being transferred.

The data may be sampled from the data lines 34A into the data in buffer 56, which is coupled to provide the data to the data cache 42. In response to detecting that the read data is provided (including, in one embodiment, the read data driven by the agent 40 for the read exclusive transaction performed in response to the agent 40 performing a write hit to a shared block), the bus control circuit 50 may signal the data cache control circuit 44 that the fill data has arrived (Fill in FIG. 2) and the data may stored into the data cache 42.

The bus control circuit 50 may be responsible for snooping transactions performed by other agents on the bus 24. The address in buffer 52 may sample the address lines 30A, and the bus control circuit may detect that an address transfer is occurring on the control lines 60 which correspond to the address bus 30. The bus control circuit 50 may then snoop the data cache 42 (or a separate copy of the tags of the cache blocks stored in the data cache 42), the write buffers 48, etc. to determine if a coherency state change is to be performed in response to the snooped transaction. Any coherency protocol which includes a shared state may be used. A cache block is the unit of allocation/deallocation of space in the cache, and may be used interchangeably with the term cache line.

In addition to performing snooping for coherency state changes, the bus control circuit 50 may further snoop to detect a read exclusive request queued in response to a write to a shared cache block. If the snooped transaction causes the shared cache block to be invalidated (e.g. a snooped read exclusive transaction), the indication with the read exclusive request that indicates that the bus control circuit 50 is to provide a response in the response phase indicating that the agent 40 will supply the data may be changed so that the read exclusive transaction is performed normally (i.e. with another agent providing the data).

Generally, the request buffers 46 may be one or more request buffers, according to design choice. Each request buffer may store the address of a request, the type of transaction requested, and any other information that may be useful in various embodiments. The request buffers may be divided into various types (e.g. certain buffers may be used for cache fill requests, others for evictions of modified cache blocks (or cache blocks corresponding to write hits to a shared cache block) etc.). Similarly, the write buffers 48 may be one or more write buffers. Each write buffer may be capable of storing a cache block to be written back to memory (or to be provided for storage in the data cache 42, in the case of a write hit to a shared cache block).

The data cache 42 may generally be any type of cache. The data cache 42 may be capable of storing one or more cache blocks and corresponding coherency states. Any organization may be used (e.g. direct-mapped, set associative, fully associative, etc.). The data cache 42 may include storage for the cache blocks, tags, and coherency state, as well as one or more comparators for comparing the input address to the tags to detect a hit or miss in the data cache 42.

Generally, a write to a cache block is an access performed to change the value of at least one byte within the cache block. For example, in processor agents, the write may be the result of a store instruction executed by the processor agent. As another example, for I/O bridges, the write may be the result of the operation of an I/O interface or a device connected to the interface.

While the embodiment shown in FIG. 2 communicates via a bus 24, generally an agent may communicate using any interface. An interface may be a bus, a packet based distributed interface, or any other communication mechanism. Furthermore, a "response phase" is a portion of a transaction in which the coherency protocol is enforced through the exchange of information between the coherent agents. In various embodiments, a coherent agent may indicate, during the response phase, the coherency state that should be assigned by the receiving agent of the cache block transferred during the transaction or, alternatively, the state that the coherent agent will assign to its own cached copy of the affected cache block as a result of the transaction. Based on one or more of the type of transaction, the current coherency state, and the information supplied in the response phase, each coherent agent may ensure that an appropriate coherency state is assigned to any copy of the affected cache block in that coherent agent. If the interface is a bus, for example, the response phase may occur on one or more response lines 32 at a set interval after the address transfer for the transaction. The interval may be fixed or programmable, as desired. In a distributed packet-based system, the response phase may include one or more packets from each coherent agent (or those coherent agents which have cached copies of the affected cache block).

In one specific implementation of the system 10 shown in FIG. 1, the response lines 32 may comprise a separate shared line and a separate exclusive line for each agent on the bus 24. A shared signal on the shared line may be asserted to indicate that the requesting agent should receive the block in the shared state (e.g. the corresponding agent is maintaining a shared copy of the cache block). An exclusive signal on the exclusive line may indicate that the corresponding agent has a copy of the cache block in an exclusive state (e.g. a modified state or a non-modified but exclusive state). Assertion of the exclusive signal by an agent may cause the L2 cache 14 and the memory controller 16 to not supply data for the transaction. The agent signalling exclusive supplies the copy. In such an embodiment, the agent 40 may assert its exclusive signal during the response phase of its own read exclusive transaction, if the read exclusive transaction is performed in response to a write hit to a shared cache block. However, other embodiments may employ other responses to indicate that a given agent will supply the data. For example, a separate signal from signals indicating the coherency state may be used to indicate that the agent will supply the data. Any indication may be used, in various embodiments.

As used herein, a read exclusive transaction is a read transaction which is used by the requesting agent to request that other cached copies of the affected block be invalidated in response to the transaction (and thus the requesting agent has the only copy of the affected block after the transaction occurs). Receiving agents of the read exclusive transaction may provide a copy of the affected cache block (e.g. by writing back to memory or by supplying the cache block directly) if the cache block has been modified by the receiver, but the copy is invalidated within the receiving agent in either case.

It is noted that, in one embodiment, the data lines 34A illustrated in FIG. 2 may be capable of transferring an entire cache block in one transfer (e.g. a cache block may be 256 bits, or 64 bytes, in such an embodiment). However, other embodiments may use several transfers across the data lines to transfer a cache block. More or fewer data lines may be provided on the data bus for various embodiments. Similarly, the size of the address as illustrated in FIG. 2 may be varied.

It is noted that, while certain embodiments above evict the shared cache block from the data cache 42 in response to a write hit to the shared cache block (thus invalidating the cache block in the data cache 42 and transferring the shared cache block to the write buffers 48), other embodiments may not evict the cache block from the data cache 42. For example, embodiments in which the data transfer for the read exclusive transaction is not performed if the read exclusive transaction is the result of a write hit to a shared cache block may not evict the cache block. Additionally, an embodiment is contemplated in which the data is provided for transfer on the data bus, but the cache block is not evicted from the data cache. The cache block may be updated after the response phase in the data cache 42, and the unmodified data may be transferred on the data bus (and ignored by the agent 40). Furthermore, other embodiments may evict the cache block but not perform the data transfer (instead transferring the data internally from the write buffer 48 back into the data cache 42 after the response phase of the read exclusive transaction).

It is noted that address buffers 52 and 54 and data buffers 56 and 58 are optional and may be eliminated in other embodiments. It is further noted that agent 40 may be any agent which is configured to cache data. For example, in the embodiment of FIG. 1, agent 40 may be any of processors 12A–12B, I/O bridges 20A–20B, etc.

Figure 3:
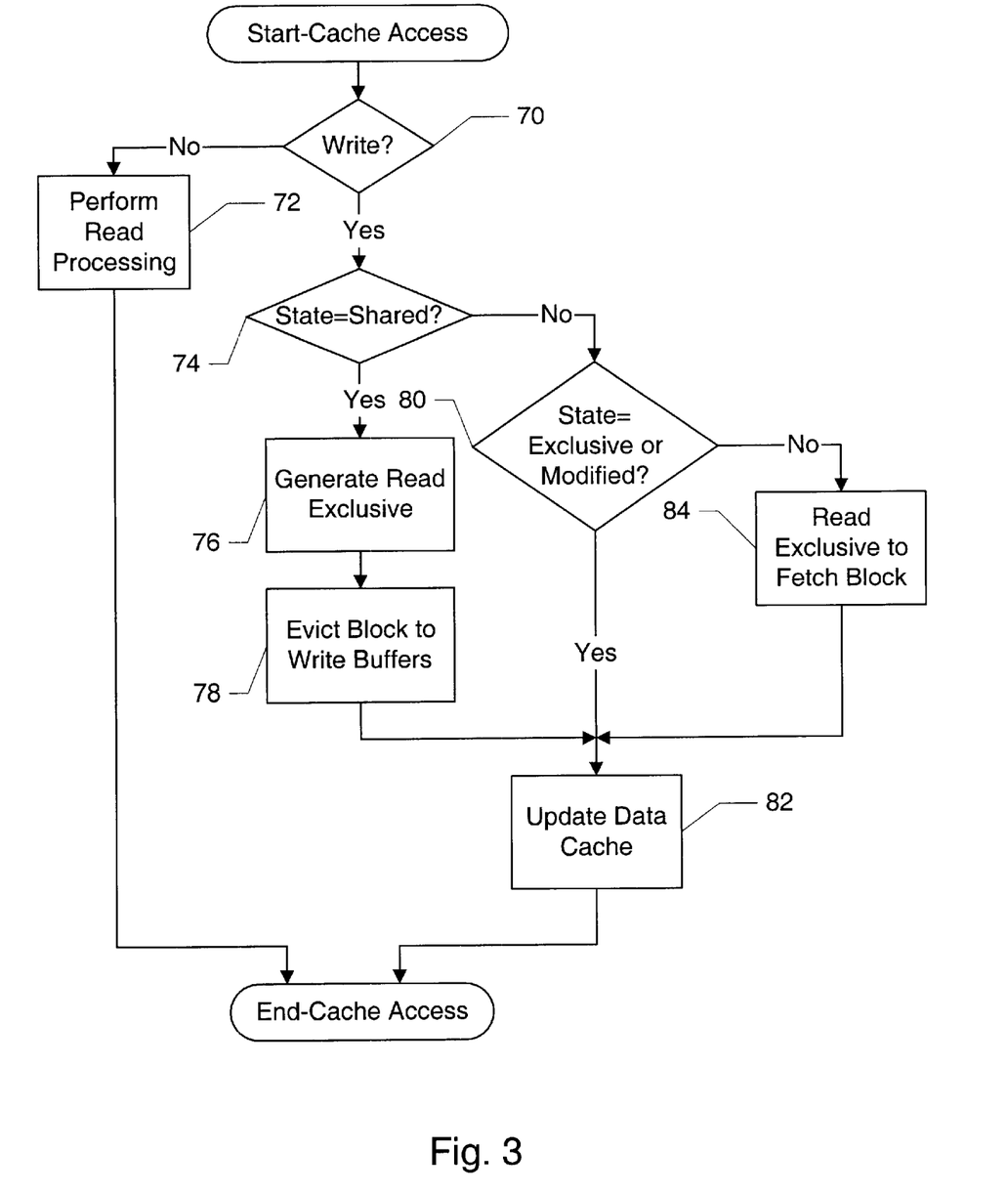
FIG. 3 is a flowchart illustrating operation of one embodiment of the agent shown in FIG. 2 during a cache access.

Turning next to FIG. 3, a flowchart is shown illustrating operation of one embodiment of the agent 40 (particularly the data cache control circuit 44) during a cache access to data cache 42. Other embodiments are possible and contemplated. While the blocks shown in the embodiment FIG. 3 are illustrated in a particular order for ease of understanding, any suitable order may be used. Furthermore, blocks may be performed in parallel by combinatorial logic circuitry within the agent 40/data cache control circuit 44 and/or may be performed in different clock cycles, as desired. The embodiment shown may be compatible with the MESI coherency protocol, although other embodiments may implement other coherency protocols.

If the cache access is not a write (i.e. it is a read) (decision block 70), then the data cache control circuit 44 performs read processing (block 72). On the other hand, if the cache access is a write and the state is shared (decision block 74), then the data cache control circuit 44 may generate a read exclusive transaction request (block 76). Additionally, in one embodiment, the data cache control circuit 44 may evict the shared cache block (block 78). It is noted that the eviction of the shared cache block may be performed subsequent to detecting the write to the shared block. Furthermore, other embodiments may evict the cache block when the fill data is provided. Still further, as mentioned above, other embodiments may not evict the shared cache block. The data cache 42 may be updated once the read exclusive transaction has occurred (and the cache block has been returned to the cache, if applicable) (block 82).

If the state of the cache block is not shared, the state is either exclusive, modified, or invalid. If the state of the cache block is exclusive or modified (decision block 80), then the data cache control circuit 44 signals the data cache 42 to update with the data provided in response to the write (block 82). If the state of the cache block is invalid, then the data cache control circuit 44 may generate a read exclusive transaction request to fetch the cache block (block 84). Subsequent to receiving the cache block in response to the read exclusive transaction, the cache is updated (block 82). It is noted that, in this case, the read exclusive transaction is performed normally. As mentioned above, an indication may be provided in the request buffers 46 to distinguish between a read exclusive for a write hit to a shared cache block versus a write miss (coherency state=invalid). Alternatively, the bus control circuit 50 may, in embodiments in which the shared cache block is evicted, search the write buffers 48 to determine if the shared cache block is stored therein to distinguish. In other implementations, the write miss may not generate a read exclusive transaction. Instead, a write may be performed on the bus 24 to transfer the corresponding data to memory.

Figure 4:
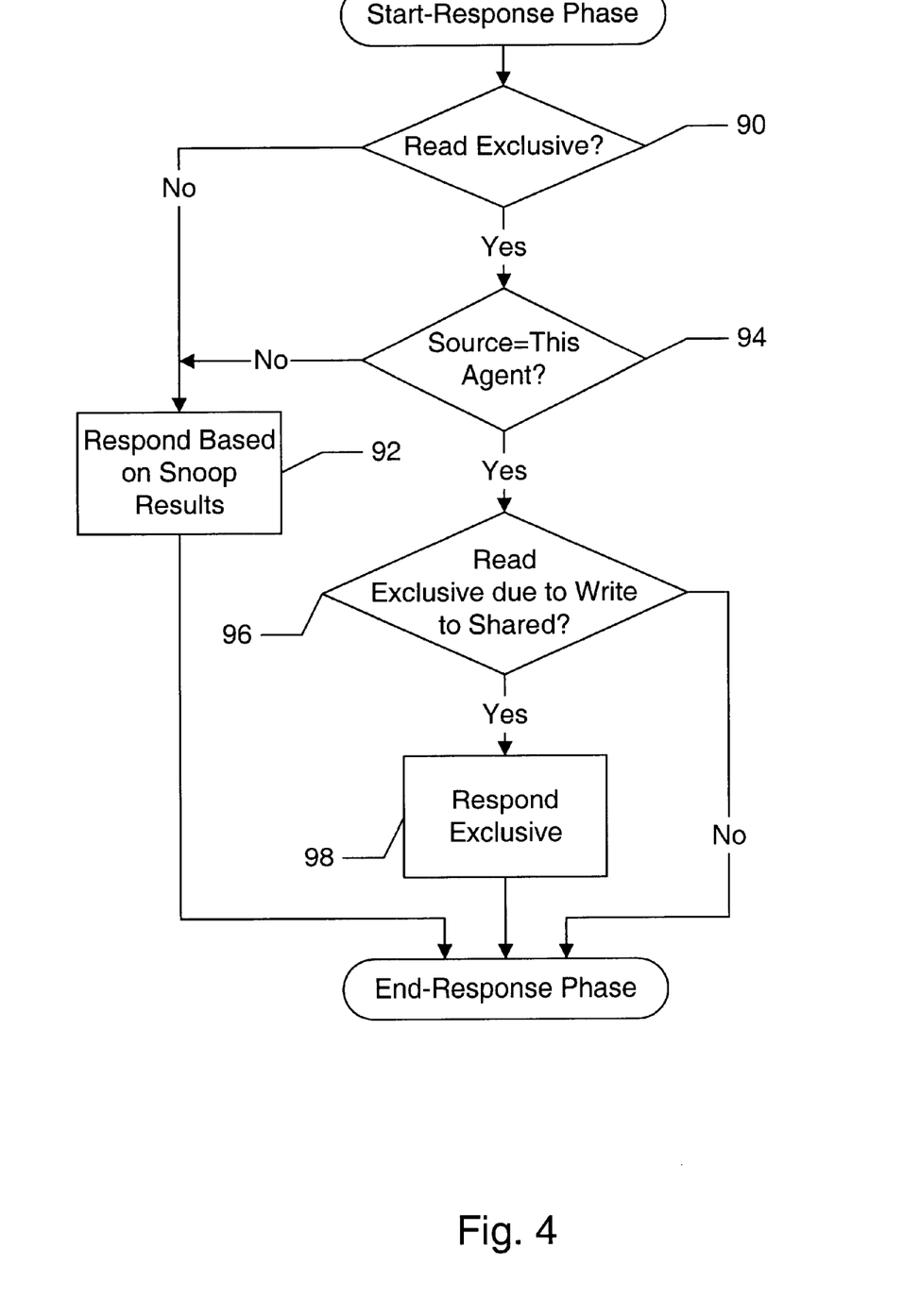
FIG. 4 is a flowchart illustrating operation of one embodiment of the agent shown in FIG. 2 during a response phase of a transaction.

Turning now to FIG. 4, a flowchart illustrating operation of one embodiment of the agent 40 (specifically, the bus control circuit 50) during a response phase of a transaction is shown. Other embodiments are possible and contemplated. While the blocks shown in the embodiment FIG. 4 are illustrated in a particular order for ease of understanding, any suitable order may be used. Furthermore, blocks may be performed in parallel by combinatorial logic circuitry within the agent 40/bus control circuit 50 and/or may be performed in different clock cycles, as desired.

If the transaction is not a read exclusive transaction (decision block 90), the bus control circuit 50 responds to the transaction based on snoop results generated/collected by the bus control circuit 50 in response to the address phase of the transaction (block 92). Similarly, if the transaction is a read exclusive transaction (decision block 90) and the source of the transaction is not agent 40 (decision block 94), the bus control circuit 50 responds to the transaction based on the snoop results (block 92). If the transaction is a read exclusive transaction (decision block 90) sourced from the agent 40 (decision block 94) and the read exclusive transaction is due to a write hit to a shared cache block (decision block 96), then the bus control circuit 50 provides the exclusive response on the bus 24 (block 98). If the transaction is a read exclusive transaction (decision block 90) sourced from the agent 40 (decision block 94) and the read exclusive transaction is not due to a write hit to a shared cache block (decision block 96), then the bus control circuit 50 may provide no response on the bus 24.

Figure 5:
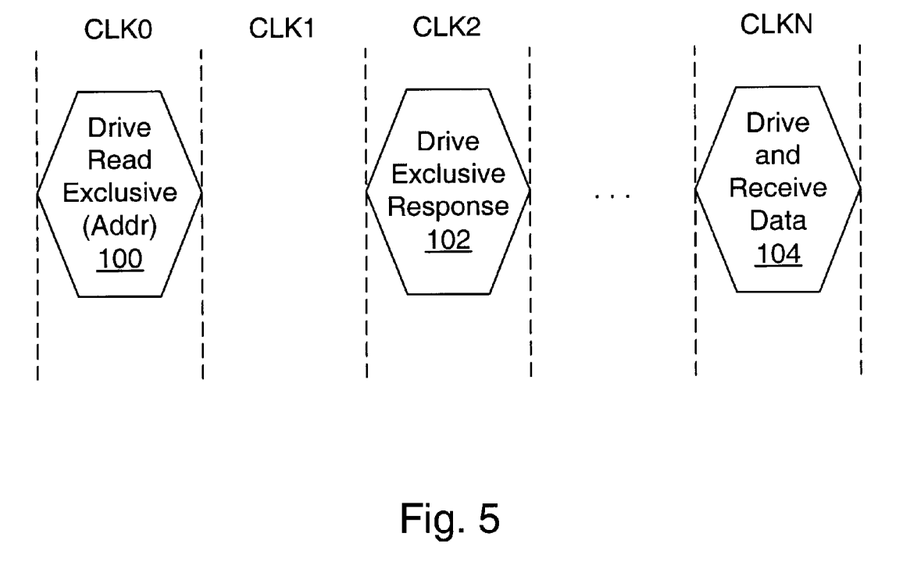
FIG. 5 is a timing diagram illustrating one embodiment of a read exclusive transaction.
Figure 6:
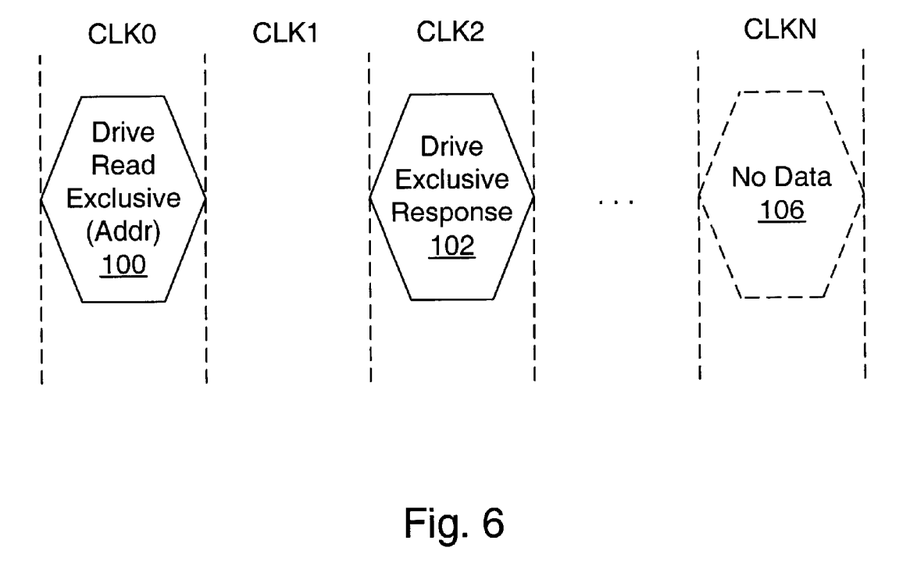
FIG. 6 is a timing diagram illustrating a second embodiment of a read exclusive transaction.

Turning next to FIGS. 5 and 6, timing diagrams are shown illustrating a pair of embodiments of a read exclusive transaction. Other embodiments are possible and contemplated. In FIGS. 5 and 6, clock cycles are delimited by vertical dashed lines and labeled at the top (e.g. CLK0, CLK1, etc.). The ellipses between CLK2 and CLKN are intended to illustrate the elapse of zero or more clock cycles.

Referring to FIG. 5, during clock cycle CLK0, the agent 40 drives the address transfer during the address phase of the read exclusive transaction (reference numeral 100). The response phase of the read exclusive transaction occurs in clock cycle CLK2 (reference numeral 102), and thus the agent 40 drives the exclusive response for the read exclusive transaction. Accordingly, the delay from the address phase to the response phase is two clock cycles in the illustrated embodiment, although other embodiments may employ a larger or smaller delay. Finally, during clock cycle CLKN, the data phase of the read exclusive transaction occurs (reference numeral 104). Since the agent 40 is both source and receiver for the data, the agent 40 drives and receives the data during the data phase. Each of the address phase, the response phase, and the data phase comprises one clock cycle in the illustrated embodiment, although other embodiments may include more than one clock cycle in any phase, and the phase may each last differing numbers of clock cycles, as desired.

The second embodiment illustrated in FIG. 6 is similar to the first embodiment, except that no data phase is performed. Thus, in the embodiment of FIG. 6, the read exclusive transaction includes the address and response phases in clock cycles CLK0 and CLK2, respectively (reference numerals 100 and 102, respectively). The lack of a data phase for the embodiment of FIG. 6 is illustrated by the dashed enclosure of the phrase "no data" in clock cycle CLKN (reference numeral 106).

It is noted that, while clock cycles are illustrated in the timing diagrams of FIGS. 5 and 6, in one embodiment the rising and falling edges of the clock signal defining the clock cycles are used to transmit data. One of the edges (e.g. the rising edge) may be used to cause the driving device to drive the data, and the other edge (e.g. the falling edge) may be used to sample the data.

Figure 7:
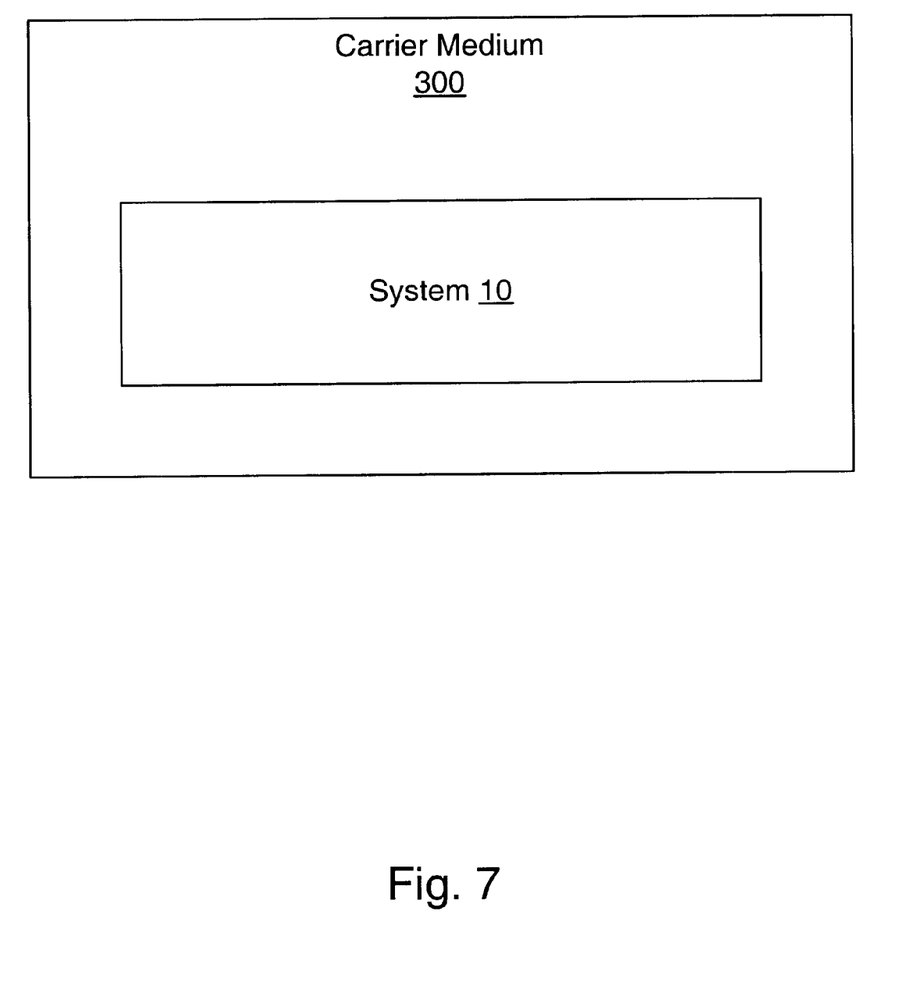
FIG. 7 is a block diagram of one embodiment of a carrier medium.

Turning next to FIG. 7, a block diagram of a carrier medium 300 including a database representative of system 10 is shown. Generally speaking, a carrier medium may include storage media such as magnetic or optical media, e.g., disk or CD-ROM, volatile or non-volatile memory media such as RAM (e.g. SDRAM, RDRAM, SRAM, etc.), ROM, etc., as well as transmission media or signals such as electrical, electromagnetic, or digital signals, conveyed via a communication medium such as a network and/or a wireless link.

Generally, the database of system 10 carried on carrier medium 300 may be a database which can be read by a program and used, directly or indirectly, to fabricate the hardware comprising system 10. For example, the database may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising system 10. The netlist may then be placed and routed to produce a data set describing geometric shapes to be applied to masks. The masks may then be used in various semiconductor fabrication steps to produce a semiconductor circuit or circuits corresponding to system 10. Alternatively, the database on carrier medium 300 may be the netlist (with or without the synthesis library) or the data set, as desired.

While carrier medium 300 carries a representation of system 10, other embodiments may carry a representation of any portion of system 10, as desired, including any set of one or more agents (e.g. processors, L2 cache, memory controller, etc.) or circuitry therein (e.g. interface circuits, request buffers, write buffers, caches, cache control circuits, etc.), bus 24, etc.

Numerous variations and modifications will become apparent to those skilled in the art once the above disclosure is fully appreciated. It is intended that the following claims be interpreted to embrace all such variations and modifications.

What is claimed is:

1. An agent comprising:
   a cache configured to store at least a first cache block and a first coherency state corresponding to the first cache block; and
   an interface circuit configured to communicate on an interface with other agents, wherein the interface circuit is configured to initiate a read exclusive transaction on the interface in response to a write which hits the first cache block and the first coherency state is shared, and wherein the interface circuit is configured, during the read exclusive transaction, to indicate to one or more responding agents of the read exclusive transaction that a data transfer is not required for the read exclusive transaction.

2. The agent as recited in claim 1, wherein the interface circuit is configured to indicate to the one or more responding agents using a first response during a response phase of the read exclusive transaction, and wherein the first response indicates that the agent will provide data for the read exclusive transaction.

3. The agent as recited in claim 2 wherein the first response is a response of exclusive ownership.

4. The agent as recited in claim 1 further comprising a cache control circuit coupled to the cache, wherein the cache control circuit is configured to generate a request for the read exclusive transaction in response to detecting the write which hits the first cache block and the first coherency state is shared.

5. The agent as recited in claim 4 further comprising a buffer coupled to the cache control circuit and the interface circuit, the buffer configured to store requests for transactions to be initiated by the interface circuit, and wherein the buffer is configured to store the request for the read exclusive transaction.

6. The agent as recited in claim 4 wherein the cache control circuit is configured to evict the first cache block from the cache.

7. The agent as recited in claim 6 wherein the interface circuit is configured to drive the first cache block on the interface during a data phase of the read exclusive transaction.

8. The agent as recited in claim 7 wherein the agent is further configured to capture the first cache block from the interface and to store the first cache block in the cache.

9. The agent as recited in claim 1 wherein the interface circuit is configured to inhibit a data phase of the read exclusive transaction.

10. The agent as recited in claim 1 wherein the interface is a bus.

11. A method comprising:
    detecting a write hit to a first cache block in a cache within a first agent, wherein a first coherency state corresponding to the first cache block is shared;
    initiating a read exclusive transaction on an interface from the first agent in response to the detecting; and
    during the read exclusive transaction, indicating to one or more responding agents of the transaction that a data transfer is not required for the read exclusive transaction.

12. The method as recited in claim 11 wherein the indicating comprises providing a first response from the first agent during a response phase of the read exclusive transaction, the first response indicating that the first agent will provide data for the read exclusive transaction.

13. The method as recited in claim 12 wherein the first response is a response of exclusive ownership.

14. The method as recited in claim 11 further comprising evicting the first cache block from the cache in response to the detecting.

15. The method as recited in claim 14 further comprising driving the first cache block on the interface during a data phase of the read exclusive transaction.

16. The method as recited in claim 15 further comprising capturing the first cache block from the interface and storing the first cache block in the cache.

17. The method as recited in claim 11 further comprising inhibiting a data phase of the read exclusive transaction.

18. An agent comprising:
    a cache configured to store at least a first cache block and a first coherency state corresponding to the first cache block; and
    an interface circuit configured to communicate on an interface with other agents, wherein the interface circuit is configured to initiate a read exclusive transaction on the interface in response to a write which hits the first cache block and the first coherency state is shared, and wherein the interface circuit is configured, during a response phase of the read exclusive transaction, to provide a first response indicating that the agent will provide data for the read exclusive transaction.

19. The agent as recited in claim 18 wherein the first response is a response of exclusive ownership.

20. The agent as recited in claim 18 further comprising a cache control circuit coupled to the cache, wherein the cache control circuit is configured to generate a request for the read exclusive transaction in response to detecting the write which hits the first cache block and the first coherency state is shared.

21. The agent as recited in claim 20 wherein the cache control circuit is configured to evict the first cache block from the cache.

22. The agent as recited in claim 21 wherein the interface circuit is configured to drive the first cache block on the interface during a data phase of the read exclusive transaction.

23. The agent as recited in claim 22 wherein the agent is further configured to capture the first cache block from the interface and to store the first cache block in the cache.

24. The agent as recited in claim 18 wherein the interface is a bus.

* * * * *